United States Patent [19]

Moreau

[11] 4,027,514

[45] June 7, 1977

[54] DEVICE FOR CONTINUOUS EXTRUSION

[75] Inventor: Marc Moreau, Asnieres, France

[73] Assignee: Trefimetaux, Argenteuil, France

[22] Filed: Sept. 1, 1976

[21] Appl. No.: 719,522

[30] Foreign Application Priority Data

Dec. 12, 1975 France .............................. 75.39401

[52] U.S. Cl. ..................................... 72/60; 72/270; 72/284; 226/172
[51] Int. Cl.² ................... B21D 15/06; B65H 17/34
[58] Field of Search .............. 72/60, 270, 284, 422, 72/271; 226/172

[56] References Cited

UNITED STATES PATENTS

| 2,915,171 | 12/1959 | Peck | 226/172 |
|---|---|---|---|
| 3,251,253 | 5/1966 | Eubanks | 226/172 X |
| 3,667,267 | 11/1969 | Fuchs, Jr. | 72/60 |
| 3,738,138 | 6/1973 | Fuchs, Jr. | 72/60 |
| 3,740,985 | 11/1971 | Fuchs, Jr. | 72/60 |

Primary Examiner—Leon Gilden
Attorney, Agent, or Firm—Dennison, Dennison, Meserole & Pollack

[57] ABSTRACT

A device for the continuous extrusion of an object of indefinite length into another object of indefinite length by means of movable elements which move inside a resistant body forming a continuous pressure cylinder inside which the object to be extruded is driven towards a die by means of a viscous fluid surrounding it.

9 Claims, 10 Drawing Figures

FIG. 9
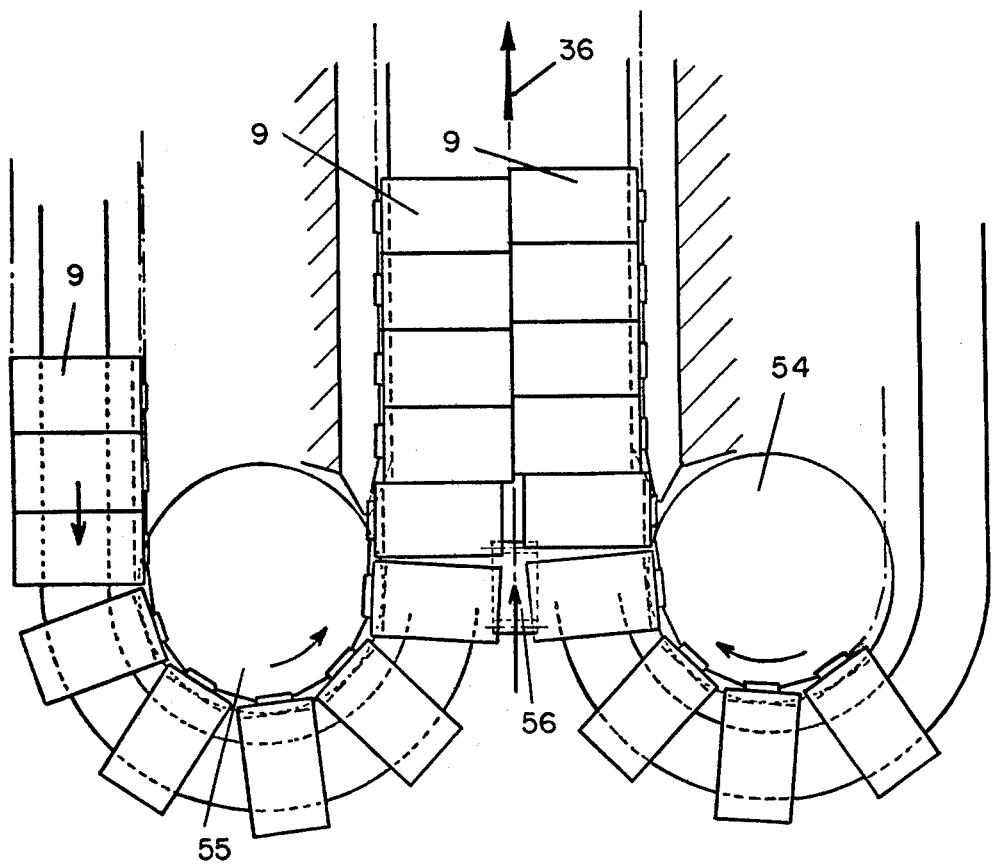
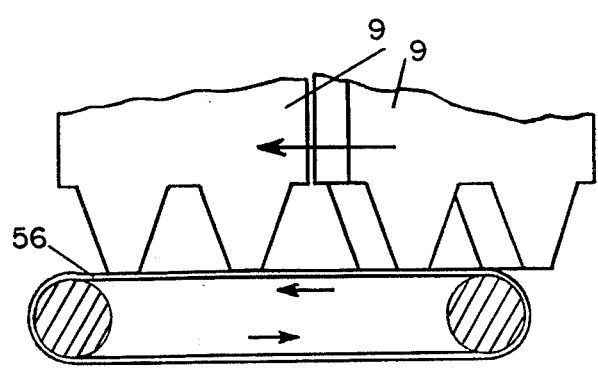
FIG. 10

DEVICE FOR CONTINUOUS EXTRUSION

The present invention relates to a device for the implementation of a continuous extrusion process in which an object of indefinite length is transformed into another object of indefinite length of smaller cross section by passing through a die having the geometrical form desired for the extruded object.

It has been known for a long time that many metals and alloys have an increasing ductility when they are subjected to increasing pressures. P. W. Bridgmann has described this effect, called the "Bridgmann effect", in "Large Plastic Flow and Fracture" published by McGraw Hill (New York) around 1952. It permits large deformations without fracture of metal objects by subjecting them to very high pressures.

It has been attempted to use this property in discontinuous processes in which the initial objects and the final objects have a limited albeit large length.

Continuous processes have also been proposed in which the starting object and the extruded object have an indefinite length which could be unlimited. For example, according to author's certificate 176,229 filled in the U.S.S.R. on November 26, 1963, a wire is drawn toward a die and pushed through it under the action of a fluid flow introduced under high pressure at the rear of a fixed cylinder, issuing towards the front of this cylinder and surrounding the wire inside this cylinder. In theory the fluid which flows in the desired direction for the displacement of the wire draws the latter in this direction and causes it to pass through the die. However, the maximum fluid pressure and consequently the maximum ductility of the object treated are located at the rear of the cylinder and not in the vicinity of the die as would be necessary to ensure that the process would run well.

Other more complex devices have been proposed based on the same principle. For example in French Pat. 2,029,568 and the corresponding U.S. Pat. No. 3,667,267 it is attempted to avoid the difficulty just indicated by dividing the course of a fluid under pressure into several fractions, in a series of compartments having fixed walls, arranged successively along the path followed by the object in the process of extrusion, the fluid being introduced at the rear of the compartment nearest to the die and issuing at the front of this compartment in the vicinity of the die and then passing through each of the other compartments in the same way beginning with the compartment nearest to that from which it issues. Thus one arrives at extremely complex devices.

It has finally been proposed, for example in French Pat. 2,160,413 and in the corresponding U.S. Pat. No. 3,740,985, to drive a fluid toward the die and to create there the necessary high pressure by virtue of trains of movable elements, preferably four in number, each of which moves on an endless path and which converging around the object to be treated at a point upstream of the die on their path, forming, from this point to the die, a pressure cylinder blocked by the die. At the beginning of this portion of their path, the elements of each of the trains are driven and pushed toward the die by two fluid motors acting on this train. In order to ensure tightness between the elements of each train they are braked in the vicinity of the die by another fluid motor. The totality of the elements forming at each instant the pressure cylinder moves inside a second fixed pressure cylinder formed from an equal number of elements on the internal face of which they are supported by means of a fluid under pressure. These second elements are themselves located inside a cylinder. Such a device is again very complex because of the large number of movable elements, the number of successive enclosures on a cross section perpendicular to the axis and because of the large number of motors of which the relative power must be regulated so that the braking motors ensure tightness between each of the movable elements, that which follows and that which precedes, without however slowing down or hindering the movement of the said movable elements toward the die.

The device according to the present invention brings together simple means to form permanently, by means of movable elements, a pressure cylinder inside which is gripped the object of indefinite length to be extruded surrounded by a viscous fluid which, carried toward a die by the movement of the said movable elements, in its turn carries the object to be extruded toward the die and causes it to pass through the die.

The device according to the invention comprises:

an elongated body capable of resisting without deformation a high internal pressure wherein the body has an internal cross section of a generally rectangular form and is provided on each of lateral walls with machined surfaces elongated in the direction of the length of the body, said surfaces working together with machined surfaces on movable elements which during their passage inside the resistant body slide without force along the machined surfaces of the resistant body, the internal lateral faces of the body and the lateral faces of the movable elements working together with the machined surfaces to form, on the outside of the movable elements, a space forming a pressure chamber;

a die carried by a die stock at the downstream end of the resistant body;

two series of movable elements working together with one another during the passage of the said elements inside the resistant body, the movable elements having an external cross section of generally rectangular form corresponding in groups of two to the internal section of the resistant body and being provided at the bottom and at the top of their lateral surfaces with machined surfaces working together with those of the resistant body during the displacement of the movable elements inside the latter, the upper and lower surfaces of each movable element having teeth oriented perpendicular to the direction of its displacement, each movable element having on the face which will come opposite another movable element during their passage inside the resistant body a recess corresponding to a part of the profile of the object to be extruded and being capable of working together with the recess of another neighboring movable element corresponding to the other part of the profile to be extruded to form a hole of which the cross section is very slightly greater than that of the object to be extruded and having the same shape as the latter, the movable elements located at each instant inside the resistant body forming at each instant a cylinder termed "a pressure cylinder" having a length close to that of the resistant body, sealed downstream by the die and open to the rear at its upstream end;

means for driving the movable elements, these means consisting of a motor, a gear system connecting the motor to two pinions termed "drive pinions", the drive pinions located towards the rear of the resistant body being driven by the motor and the gear system and resting, one on the teeth of the upper surface of the movable elements, the other on the teeth of the lower surface of the movable element, the drive pinions resting on the movable elements of each of the two series and pushing them simultaneously towards the die;

means for retaining the movable elements consisting of two pinions termed "resistant pinions" located downstream of the resistant body in the vicinity of the die, resting one on the teeth of the upper surface of the movable elements, the other on the teeth of the lower surface of the movable elements, each being mounted on a shaft passing through the lateral walls of the resistant body and being supported on these walls, of two loose crowns each mounted on the shaft of a resistant pinion and of means developing an elastic torque between each loose crown and its shaft, the resistant pinions and their shafts being driven and rotated by the movable elements at the end of their path inside the resistant body, while a set of gears connected to the motor shaft drives each loose crown in a movement identical in direction and speed to that of the shaft which carries it;

means to ensure the divergence of the movable elements at the level of the die and their return upstream of the resistant body;

means known in themselves for the coating of the object to be extruded with a viscous fluid before its entry into the resistant body;

means known in themselves for fluid supply.

It will be noted that the drive of the movable elements on the one hand, and the formation and the maintenance of the pressure cylinder on the other hand, are obtained by means independent of one another and acting on different faces of the movable elements. In particular this makes it possible to place the teeth, carried by the movable elements and serving to drive them, in zones without pressure.

The device according to the invention, and its functioning, will be better understood with reference to the attached figures and to the description thereof. Additional or preferential arrangements will appear on these figures and in the course of the description thereof which can be used in the device according to the invention.

FIG. 1 is a general perspective view, cut away in part, of a device according to the invention;

FIG. 2 is a schematic section through the resistant body and the movable elements along a plane perpendicular to the longitudinal axis of the device and situated between the drive pinions and the resistant pinions. This plane has been chosen with a view to the simplification of the figure which would have been more complex if this section had been made at a point where the section plane had passed through one of the pinions;

FIGS. 9 and 10 show optional additional arrangements which can be used in the device according to the invention.

In the various figures the same elements are designated by the same reference numerals.

Figure 1:
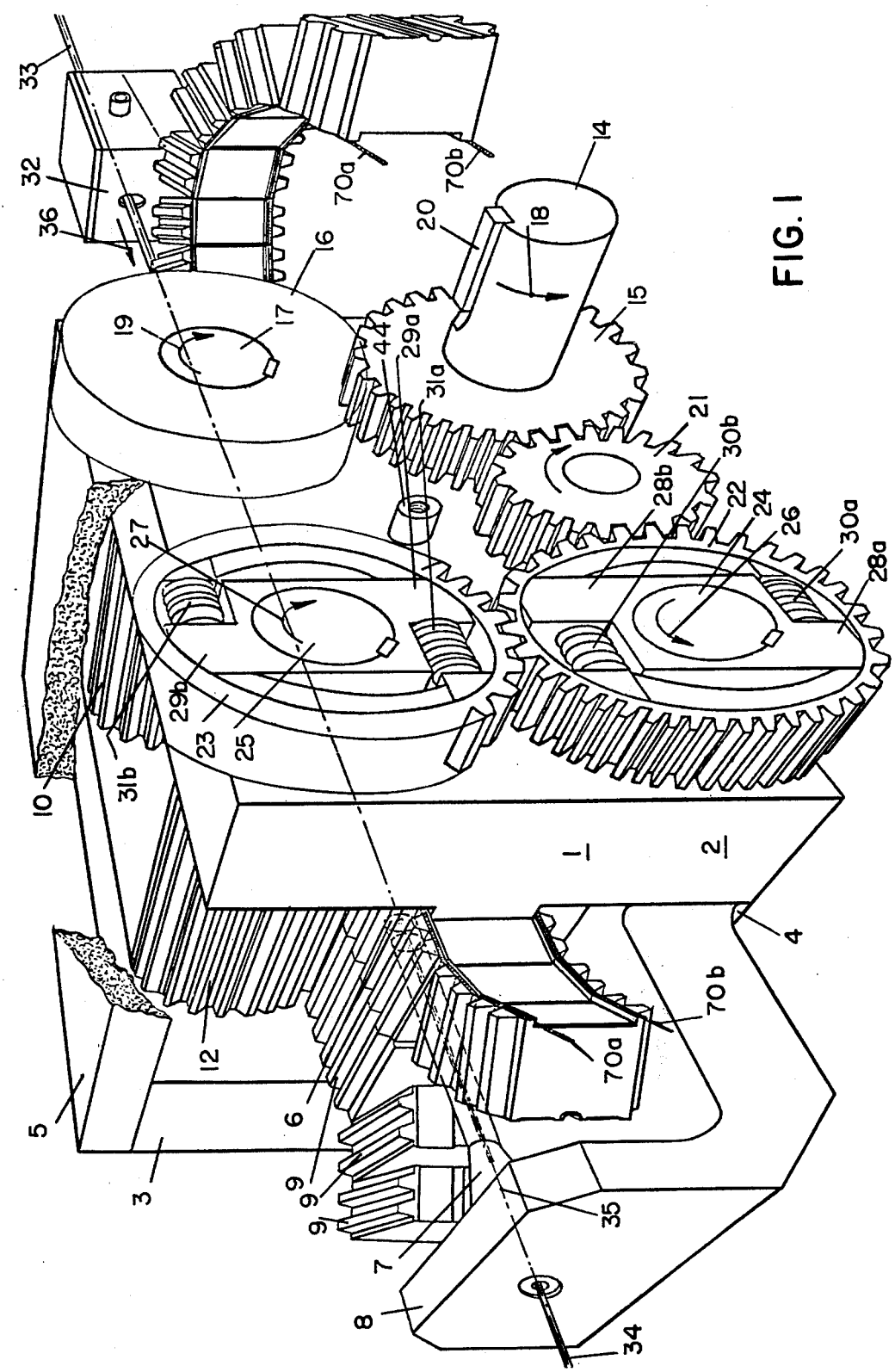

FIG. 1 shows the resistant body 1 with its sides 2 and 3, its base 4 and its upper part 5 cut away. The die 6 is advantageously located at the end of a die holder tube 7 which is itself integral with a support 8 which can, as shown in FIG. 1, constitute with the resistant body 1 a monobloc assembly. The positioning and form of such a support, and the length of the die holder tube, are not essential. It is sufficient that they allow the passage of the movable elements on leaving the body 1 during their passage upstream of this body.

FIG. 1 also shows movable elements 9 at various positions on their path. It also shows the upper pinions, the drive pinion 10 and the resistant pinion 12, the lower drive pinion 11 and resistant pinion 13 being hidden. It also shows the drive shaft 14 of the lower drive pinion 11, and on this shaft a toothed crown 15 which drives a toothed crown 16 integral with the shaft 17 of the upper drive pinion 10; this toothed crown 16 is represented by its basic cylinder. The directions of rotation of the crowns 15 and 16 are indicated respectively by the arrows 18 and 19. The motor, optionally a reduction gear motor, coupled to the shaft 14, is not shown. Only the key 20 is shown.

The toothed crown 15 also attacks a pinion 11 used as a preferred means so that the toothed crown 15 drives the toothed crown 22 connected to the toothed crown 23. The toothed crowns 22 and 23 are not keyed onto the shafts 24 of the lower resistant pinion 13 and 25 of the upper resistant pinion 12. The arrows 26 and 27 show that the crown 22 rotates in the same direction as the crown 15 and the crown 23 in the same direction as the crown 16. The speeds of rotation of the shaft 14, 17, 24 and 25 are identical by virtue of the dimensions given to the crowns 15, 16, 22, 23 and to the transmission pinion 21. It would be of no consequence if instead of being coupled to the shaft 14, the motor were coupled to the shaft 17 or the pinion 21 or to one of the crowns 22 and 23.

FIG. 1 also shows means according to the invention to ensure the retaining of the movable elements. It shows the resistant pinion 12, the toothed crowns 22, 23 and the shafts 24, 25 each carrying a resistant pinion and the corresponding loose crown. FIG. 1 also shows by way of example an embodiment of the elastic coupling between each of the shafts 24, 25 and the corresponding loose crown. This embodiment provides for each shaft-loose crown couple at least one adjustable stop such as 28a, 28b, 29a, 29b, and a spring such as 30a, 30b, 31a, 31b, working together with the corresponding stop and crown. The relationships between a shaft such as 24, the loose crown 22 which it carries, a stop such as 28a and the corresponding spring 30a will be better understood with reference to the explanation of FIG. 6. There is also shown at 32 a coating box, necessary for the functioning of the device according to the invention, but for the production of which one can use any known or new device. The method of production of this coating box is not part of the invention. The reference numeral 33 designates the object to be extruded, 34 designates the extruded object, 35 designates the axis of the device in the case shown in the figures of an object to be extruded having a circular cross section and of an extruded object of smaller circular cross section.

Figure 2:
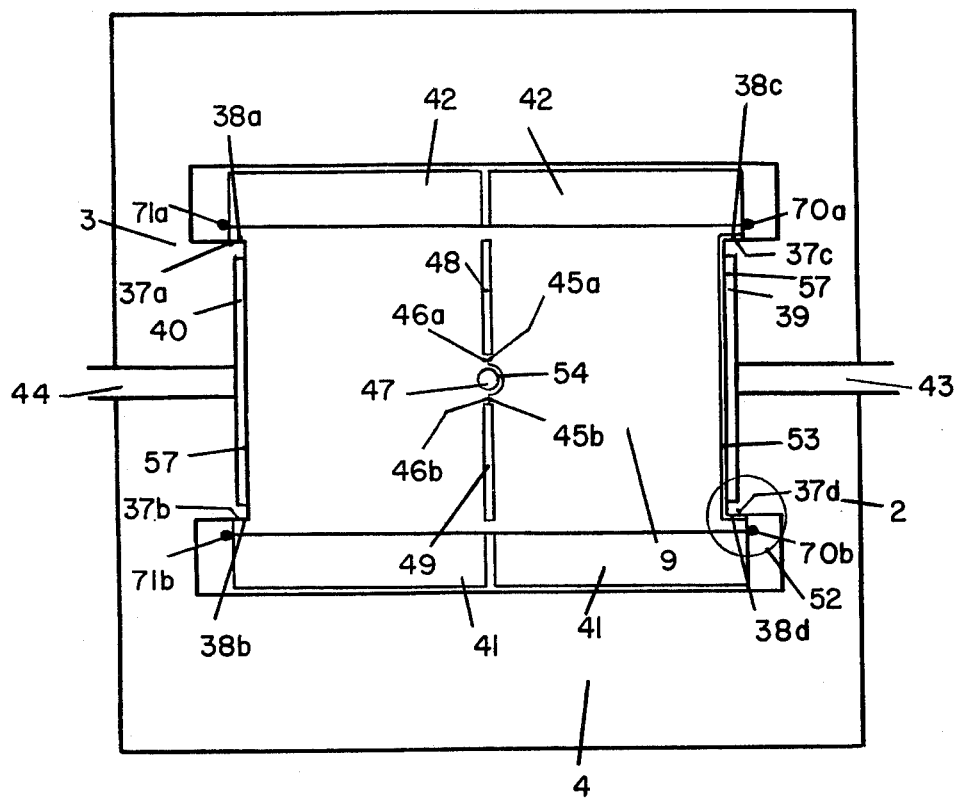

FIG. 2 shows in greater detail the relationship between the resistant body and the movable elements during the progress of the latter inside the resistant body. The resistant body is seen with its sides 2 and 3, its base 4 and its cover 5, and two movable elements 9 with the trace of their teeth, the lower teeth 41 and upper teeth 42. This figure also shows the four machined surfaces 37a, 37b, 37c, 37d of the resistant body which work together with corresponding machined surfaces 38a, 38b, 38c, 38d of the movable elements.

Between the sides 2 and 3 of the body and the lateral faces of the movable elements are arranged the spaces 39, 40, forming pressure chambers and intended to receive a fluid under pressure, for example through orifices such as 43. 44. The working together of the machined surfaces such as 37a and 38a at the same time ensures the tightness of the spaces 39 or 40 and the guiding of the movable elements inside the resistant body.

The inside faces of the elements are provided with machined surfaces such as 45a, 45b, 46a, 46b, which are pressed against one another during their passage inside the resistant body under the action of the fluid under pressure contained in the spaces 39, 40. Between the surfaces 45a, 46a on the one hand and 45b, 46b on the other hand there is located a cavity 47 identical in form to the external form of the object to be extruded and being formed by two recesses each on one of the surfaces of the opposed movable elements.

The cross-section of this cavity is very slightly greater than that of the object in the process of extrusion, the space between this object and the walls of the cavity being practically completely filled during functioning by a thin layer of a viscous fluid. By way of example, the distance between a point of the external surface of the object to be extruded and the opposite point of the cavity can be between 0.01 and 0.1 mm. If desired, the opposite surfaces of the movable elements can form spaces such as 48, 49 without pressure, which can receive the fluid which could escape between the surfaces 45a and 46a or between 45b and 46b.

Figure 3:
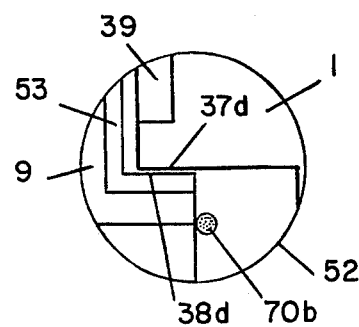
FIG. 3 is an enlargement of the portions included in the circle 52 of FIG. 2.

FIG. 3 shows on a larger scale the part of the device ringed by a circle 52 on FIG. 2 in order to display the means for providing tightness between the resistant body and the movable elements which move inside the latter. The resistant body 1 is seen with the elongated machined surface 37d, a movable element 9 with its machined surface 38d, and the pressure chamber 39. FIG. 3 also shows a projection 53 developed on at least one of the front or rear faces of each movable element 9 along the contour which will participate in the formation of the pressure chambers 39 or 40. This projection 53 also appears on one of the movable elements 9 seen in FIG. 2, a similar projection on the other movable element 9 being located on the opposite hidden face of the latter.

FIG. 2 also shows a projection 54 around the central recess of one of the movable elements. The similar projection of the other movable element is located on its opposite hidden face. The role of the projections 53 and 54 is to limit to a low value the contact surface between the two successive movable elements during their passage inside the resistant body in order to increase the force per unit of surface which, developed by the contrary action of the drive pinions and resistant pinions, presses the movable elements against one another and hence reduces the risk of fluid leakages from the chambers 39 and 40 or from the internal cavity 47.

Figure 4:
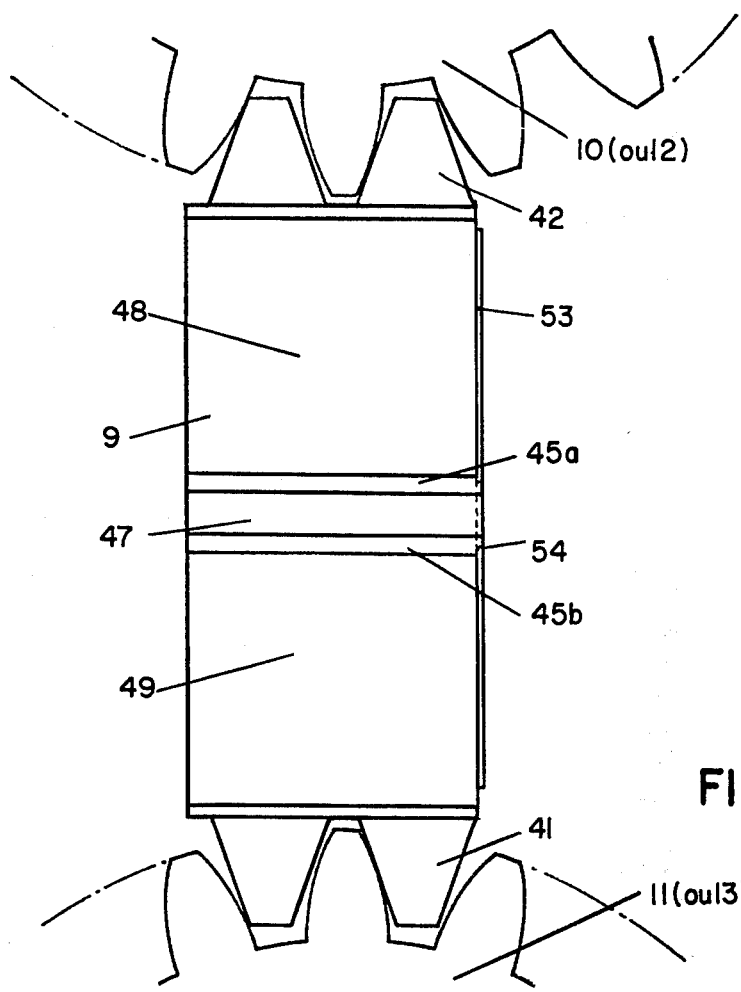
FIG. 4 is a partial schematic section along a plane passing through the longitudinal axis of the device and parallel to the lateral faces of the movable elements.

FIG. 4 is a partial view of the device cut along an axial plane perpendicular to the axes of the pinions; it is limited to one movable element and to the parts of the resistant drive pinions engaged with this element. Its purpose is to show how these various parts of the device relate. It shows a movable element 9 with its teeth such as 41 or 42 and partially shown pinions such as 10 (or 12) and 11 (or 13). The movable element is shown with four teeth (two upper and two lower); it could have a different number, for example 8. It also shows the cavity 47, the projections 53 and 54, the spaces 48, 49 and the surfaces 45a and 45b.

Figure 5:
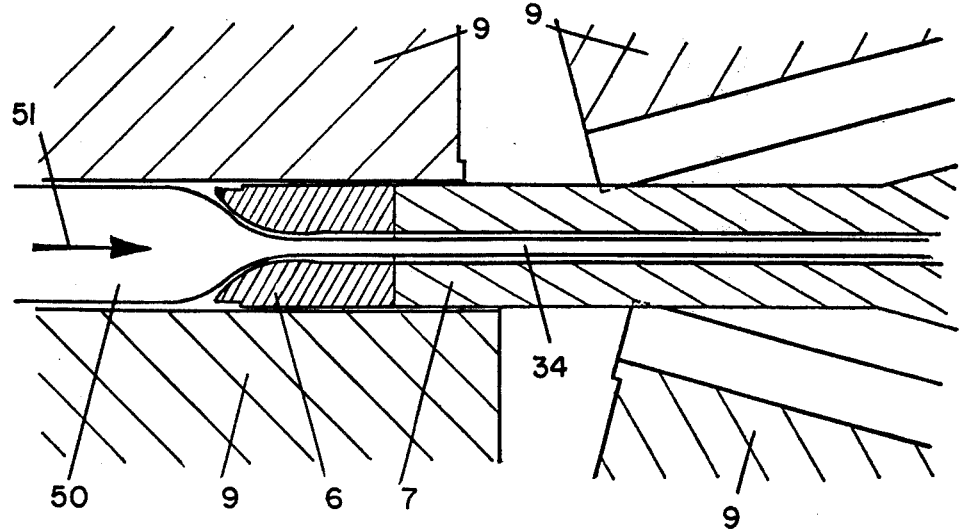
FIG. 5 is a partial section in the vicinity of the die in a horizontal plane passing through the axis of the device.

FIG. 5 shows the die 6 and the die holder tube 7, elements 9 in two successive positions along their paths, the object 50 in the process of extrusion, and the extruded object 34, the direction of movement being indicated by the arrow 51.

Figure 6:
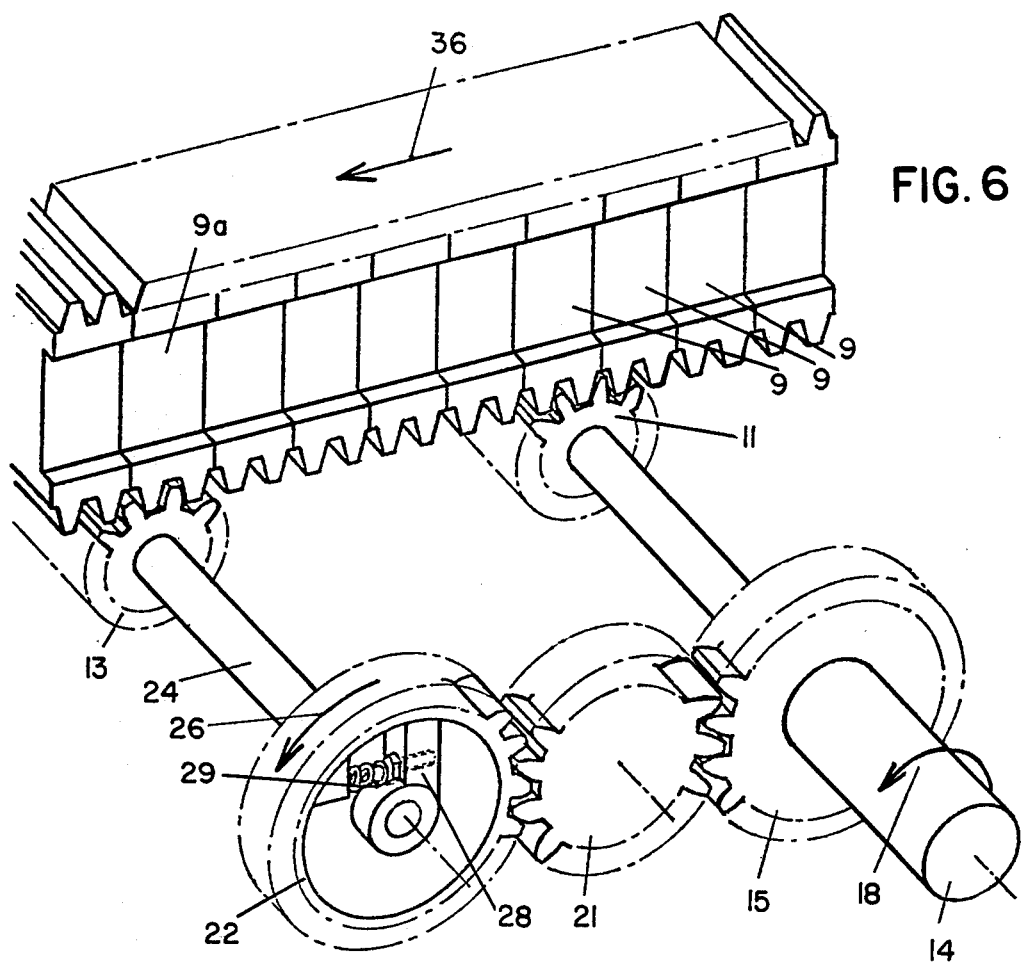
FIG. 6 is a partial schematic view illustrating the functioning of the retaining means of the movable elements.

FIG. 6 will permit an easier understanding of the functioning of the retaining means according to the invention. Only the drive and retaining means of the lower part of the device have been shown. The teeth have only been indicated insofar as their representation facilitates comprehension. It will be noted that the drawing shows a considerable clearance, greater than the real clearance between the engaged teeth, so as to illustrate the working face of each of these teeth. The figure shows a series of movable elements 9 as they appear during their passage in the resistant body, the drive shaft 14 carrying and driving the toothed crown 15 and the lower drive pinion 11, the lower resistant pinion 13 and its integral shaft 24, the loose crown 22, an adjustable stop 28 and a spring 29 working together with the crown 22 and the stop 28, and the transmission pinion 21 (the shaft supporting the latter is not shown). When the motor rotates the shaft 14 in the direction of the arrow 18, the crown 15 and the pinion 11 are driven in rotation in the same direction; the elements 9 are driven in the direction of the arrow 36; the element 9a drives the resistant pinion 13 and its shaft 24 which carries and drives the adjustable position stop 28 and which supports without driving the loose toothed crown 22. The latter is driven in rotation in the direction of the arrow 26 which is the same as that of the crown 15 indicated by the arrow 18. The dimensions of the various crowns are as shown in the figures such that the angular speeds of the shafts 14 and 24 are identical. On the crown 22 there rests one of the ends of the spring 29 of which the other end rests on the adjustable stop 28. Thus there is exerted without work a constant retaining stress on the element 9a. This stress, which is transmitted to the element 9 driven by the drive pinion 11, has the effect of pressing the elements 9 of each series against one another during their movement between the drive pinions 10, 11 and the resistant pinions 12, 13 and of thus assuring between them a good degree of tightness avoiding leakages of liquid between their contact surfaces.

As shown in FIG. 1, the elements 9 of each of the two series are interconnected to ensure the driving of each of them during their return from downstream to upstream of the resistant body outside the latter. FIG. 1 shows by way of example two cables 70a, 70b, one attached toward the top, the other toward the bottom of the outside face of each of the successive elements 9. Other means performing the same function can be used without departing from the context of the invention. It is also possible to support the elements 9 during their outside passage by means of a fixed part, not shown, such as a rail on which they slide, driven by the means which link them to one another.

Figure 7:
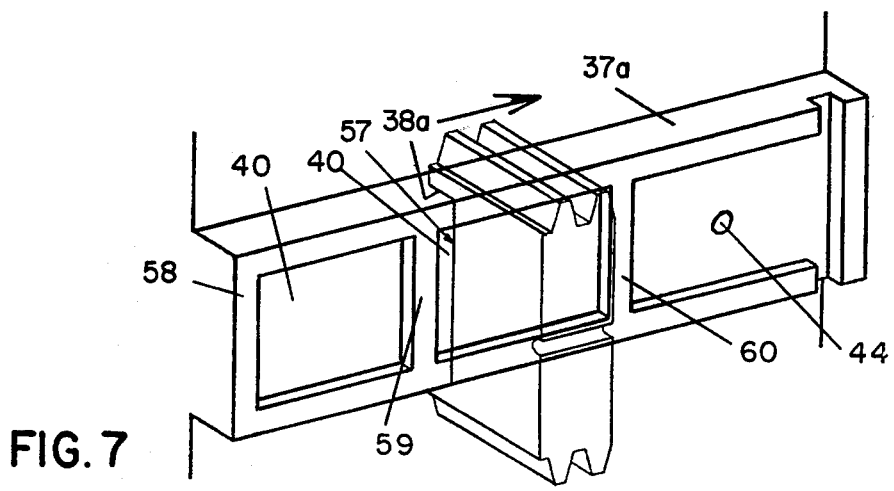
FIG. 7 is a partial schematic view showing a preferred arrangement of the inside face of one of the sides of the resistant body.

FIG. 7 shows preferred means for ensuring the tightness of the chambers 39 and 40 at the upstream entry to the resistant body. These means consist essentially of a machined surface such as 58 in a plane parallel to the lateral faces, for example 57, of the movable elements during their passage inside the resistant body. The relative situation of the surfaces 58 and the faces 57 is such that the clearance between them is very slight.

FIG. 7 also shows preferred means for establishing in the chambers 39 and 40 pressure drop from downstream to upstream. This means consists of machined surfaces such as 59 and 60 parallel to the lateral faces of the movable elements during their passage inside the resistant body. In functioning, the elastic deformation undergone by the resistant body under the effect of the pressure in the chambers 39 and 40 causes the formation of a passage between the surfaces such as 59 and 60 and the lateral faces of the movable elements which is all the more important as the pressure at the level of the surface under consideration is higher. The orifices 43 and 44 for the entry of the fluid into the chambers 39 and 40 are then placed in the downstream portion of the chambers and there is established from downstream to upstream of the chambers a decreasing pressure from a portion delimited by two surfaces such as 59 and 60 to the following portion. In this way there is obtained upstream of these chambers a pressure which is distinctly lower than the pressure existing downstream in order to diminish the deformation of the resistant body in the vicinity of the surfaces 58 and the magnitude of the leaks between the surfaces 58 and the lateral faces of the movable elements.

Figure 8:
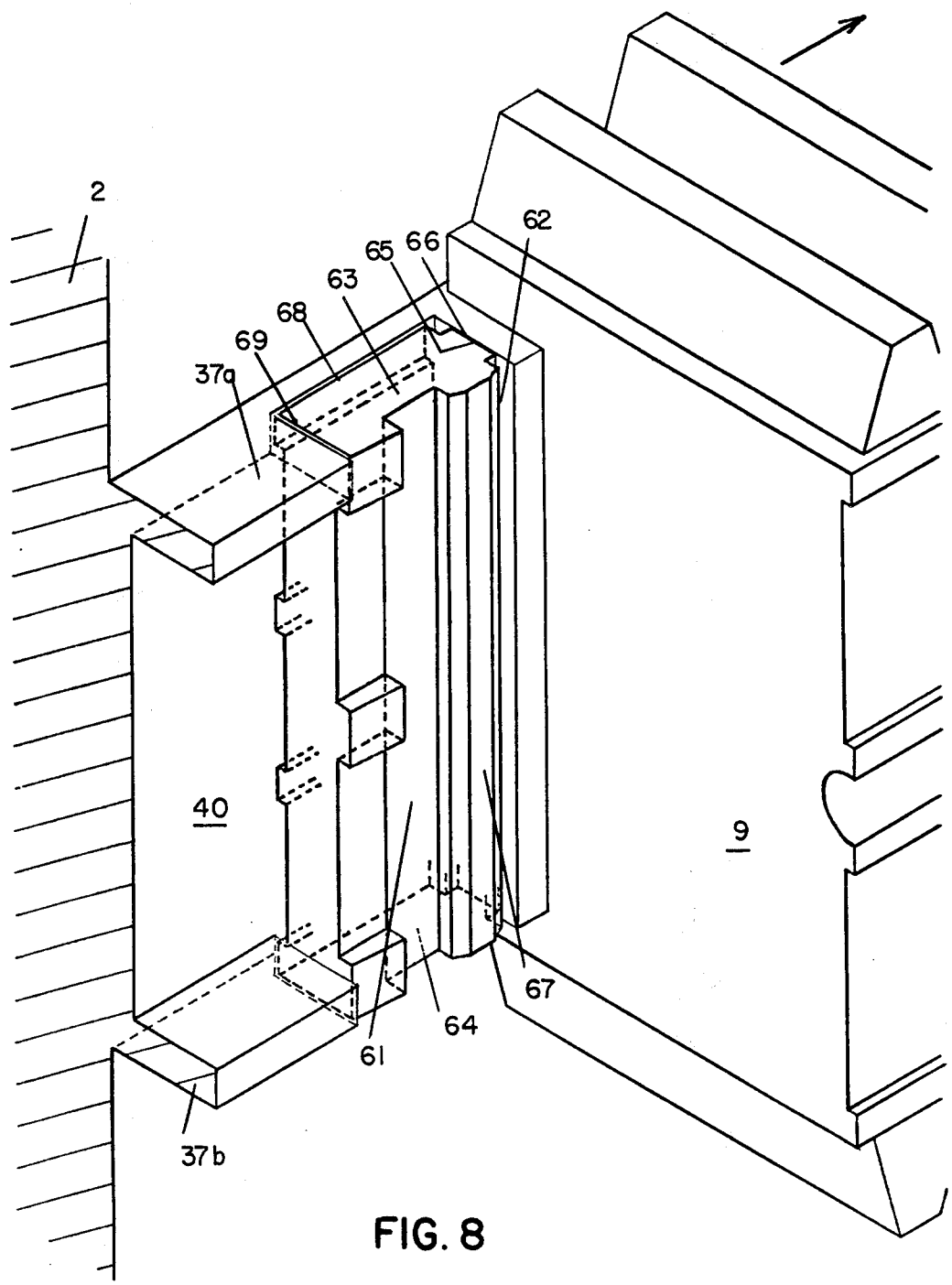
FIG. 8 shows preferred means for assuring tightness between the movable elements and the resistant body at the downstream exit of the latter.

FIG. 8, as stated, represents preferred means for ensuring tightness between the resistant body and the movable elements at the downstream exit of the latter. According to these preferred means, each of the sides 2 and 3 of the resistant body is provided toward its downstream end with a hole such as 62 into which there is inserted a floating movable element such as 61 which is provided opposite the lateral face of the movable elements with a machine surface such as 67 parallel to the said lateral face. When an element 61 is in place in its hole, its rear face 68 is subjected over all its surface to the pressure existing in the chamber 40 which is in communication with the space between the said face 68 and the corresponding surface of the resistant body. Its front face is subjected to the same pressure but because of the existence of the surface 67, on a smaller surface than that of the rear face 68. The element 61 is therefore pushed towards the axis of the device and its surface 67 pressed against the lateral faces of the movable elements which lie opposite. Similarly, under the action of the pressure in the chamber 40, the downstream face 65 of the element 61 is pressed against the machined surface 66 in the resistant body. The length of the element 61 is adjusted in such a way that its end faces such as 63 and 64 are located in the extension of the machined surfaces such as 37a and 37b. Thus leakages of the fluid present in the chambers 39, 40 are virtually eliminated.

FIGS. 9 and 10 show additional optional arrangements which can be used in conjunction with the device described above. FIG. 10 is a partial section of FIG. 9 through a plane parallel to the internal faces of the movable elements and passing through the axis of the device. FIG. 9 shows each of the series of elements 9 separated in their passage outside the resistant body (which is not shown) and working together inside this body. It also shows rollers 54, 55 which the elements 9 contact at the end of their return path towards the upstream end of the resistant body and of which the nearest points are at a distance slightly greater than that which would permit an element 9 of one series and the cooperating element 9 of the other series to touch. By virtue of this arrangement the pivoting movement of the elements 9 is not hindered. Moveover it is advisable to direct the elements 9 in such a way that their front and rear faces are substantially perpendicular to the axis of the device from the moment when they cease to be in contact with the rollers. For this purpose, and by way of a preferred optional arrangement, it is possible to support the internal part of the elements 9 when they arrive at the end of their pivoting about the rollers by means of an endless chain 56 of which the upper run supporting the elements moves in the direction of movement of the latter at a speed greater than them. This chain acts in such a way that the front faces of the internal portions of the elements 9, thus driven faster than the external portions of the same elements, come and press against the corresponding portions of the rear faces of the preceding elements. From this moment the movable elements slide on the chain which supports them. The relative arrangement of the movable elements 9 and of the chain 56 can be seen more clearly in FIG. 10.

The position of the teeth on the elements of each series may be such that the front and rear faces of one element of a series are located in the extension of the corresponding faces of the element of the other series in the course of their working together inside the resistant body. It may be preferred, as shown in FIGS. 1 and 9, to stagger the front and rear faces of the elements of a series in relation to those of the elements of the other series.

The functioning of the device according to the invention is easy to understand. The device having been started, the movement of the elements 9 brings about the continuous formation of a cylinder termed "a pressure cylinder" inside these elements. A fluid is introduced under pressure, for example, 2,000 bars, which is very viscous, through the orifices 43,44 into the spaces 39, 49. This fluid presses the elements 9 of one series against the element 9 of the other series and ensures longitudinal tightness between them during their passage in the strong body. Then the object to be extruded is advanced, coated with a very viscous fluid having for example a viscosity of 500 Poise at the working temperature, and is engaged in the pressure cylinder. Under the action of the movement of the elements 9, this fluid is carried along in the direction of the arrow 36 and itself carries along in this direction the object to be extruded. As a result of the flow resistance provided by the die, the pressure of the fluid increases all the more as it approaches the die. The object in the process of extrusion is therefore subjected on the one hand to an increase in pressure causing its ductility to increase progressively and on theother hand to a force of movement toward the die. The conjunction of these two forces permits the passage of the object through the die. The phenomenon continues until the device is stopped. It can therefore continue indefinitely.

The device according to the invention has been described with its main axis horizontal and the axes of the pinions and crowns horizontal. It would not represent a departure from the context of the invention if these various axes had different directions, it being understood that the direction of each of them must remain compatible with that of the others.

I claim:

1. A device for the continuous extrusion of an object of indefinite length into another object of indefinite length and of smaller cross section, the object in the process of treatment deforming under the effect of two forces, one resulting from a high pressure prevailing in an elongated pressure cylinder in which the object in the course of treatment moves, the other resulting from the movement of movable elements delimiting between them the pressure cylinder, this movement developing, in a fluid under pressure surrounding the object in its passage in the pressure cylinder, a force directed in the direction of movement of the object and forcing the object through a die; the said device having a resistant body including an upstream entrance and a downstream exit, said resistant body being capable of resisting a high pressure, the resistant body having an internal cross-section with elongated machined surfaces therein in the direction of its length; movable elements moving in the resistant body from upstream to downstream thereof and describing outside it a return path which brings them back upstream, said movable elements being constituted by two lateral series of elements which, associated in opposed twos, have an external cross section corresponding to the internal cross section of the resistant body and delimit in the longitudinal axis of the device a pressure cylinder having a cross section slightly greater than that of the object to be extruded, said pressure cylinder being formed by recesses hollowed out on the internal face of each of two associated movable elements, each movable element having, toward the top and toward the bottom of its lateral surface, a machined surface slidable without friction and without play along the corresponding machined surface of the resistant body, the movable elements having lower and upper surfaces with teeth thereon orientated perpendicular to the direction of their movement, the opposite lateral faces of the movable elements and of the resistant body delimiting a space termed a pressure chamber which receives a fluid under pressure which, exerting a force perpendicular to the longitudinal axis of the device presses one movable element against the associated movable element, two drive pinions driving the movable elements introduced into the resistant body toward the downstream end of the latter, one drive pinion acting on the teeth of the upper face of the movable elements, the other on the teeth of the lower face of these elements, brake means braking the movable elements downstream of the resistant body, said brake means comprising two shaft mounted resistant pinions, one engaged with and being driven by the teeth of the upper face of the movable elements, the other engaged with and being driven by the teeth of the lower face of these elements, loose crowns fitted onto the shaft of these pinions, means developing an elastic torque between each loose crown and its shaft, and means driving each loose crown in a movement identical in direction and speed to the shaft which carries it; and a die located at the downstream exit of the resistant body and blocking the pressure cylinder.

2. A device according to claim 1 wherein the internal cross-section of the resistant body is generally rectangular.

3. A device according to claim 1 wherein the means of developing an elastic torque between a loose crown and its shaft is constituted by a stop integral with the shaft and a spring resting on the one hand on the crown and on the other hand on the stop.

4. A device according to claim 1, including cables linking the movable elements of one and the same series together, one cable attached to the elements toward the top of their external face, the other toward the bottom of their external face.

5. A device according to claim 1, including rollers at the end of the return path of the elements toward the upstream end of the resistant body, the movable elements pivoting about rollers of which the closest points are at a distance slightly greater than that which would permit one movable element of the series and the cooperating movable element of the other series to touch.

6. A device according to claim 5, including an endless chain supporting the movable elements, at the end of their pivoting about the rollers, by their part which is closest to the longitudinal axis of the device, said endless chain moving in the direction of movement of the movable elements at a speed greater than that of the elements.

7. A device according to claim 1, including a recess made in each of the internal lateral walls of the resistant body at its downstream end, a floating element housed in each recess and provided with a machined surface parallel to the lateral faces of the movable elements, each of these floating elements having one of its faces pressed against the downstream internal wall of the resistant body and its machined surface pressed against a lateral face of the movable elements under the action of the pressure which prevails during functioning in the corresponding pressure chamber arranged between the resistant body and the movable elements and thus providing the sealing of this chamber on the corresponding side.

8. A device according to claim 1, wherein each of the pressure chambers between the resistant body and the movable elements is divided into portions by means of machined surfaces parallel to the lateral faces of the movable elements which permit a narrow passage of fluid under pressure from one of these portions to the following, the narrowness of these passages ensuring a decrease of the pressure from downstream to upstream of the said chambers.

9. A device according to claim 1 including means for coating the object to be extruded.

* * * * *